United States Patent [19]

Lehner et al.

[11] Patent Number: 4,656,093

[45] Date of Patent: Apr. 7, 1987

[54] MAGNETIC RECORDING MEDIA

[75] Inventors: August Lehner, Roedersheim-Gronau; Albert Kohl, Dirmstein; Hermann Roller, Ludwigshafen; Werner Balz, Limburgerhof; Eberhard Koester, Frankenthal; Friedrich Sommermann, Kehl, all of Fed. Rep. of Germany

[73] Assignee: Basf Aktiengesellschaft, Fed. Rep. of Germany

[21] Appl. No.: 685,321

[22] Filed: Dec. 24, 1984

[30] Foreign Application Priority Data

Dec. 30, 1983 [DE] Fed. Rep. of Germany ....... 3347531

[51] Int. Cl.$^4$ .............................................. G11B 5/71
[52] U.S. Cl. .................................. 428/403; 252/62.54; 427/128; 428/694; 428/695; 428/900; 428/405; 428/407
[58] Field of Search ............... 428/694, 695, 900, 403, 428/405, 407; 252/62.54; 427/128; 360/134–136

[56] References Cited

U.S. PATENT DOCUMENTS

| | | | |
|---|---|---|---|
| 3,387,993 | 6/1968 | Flowers | 428/900 |
| 3,929,658 | 12/1975 | Beske | 428/329 |
| 4,091,143 | 5/1978 | Hartman | 428/694 |
| 4,322,474 | 3/1982 | Matsuura et al. | 428/411 |
| 4,540,618 | 9/1985 | Suzuki | 428/141 |
| 4,568,619 | 2/1986 | Hiller | 428/694 |

FOREIGN PATENT DOCUMENTS

| | | | |
|---|---|---|---|
| 1232206 | 1/1967 | Fed. Rep. of Germany | 11/70 |
| 3227163 | 1/1984 | Fed. Rep. of Germany | |
| 2039281 | 8/1980 | United Kingdom | 11/70 |

*Primary Examiner*—Ellis P. Robinson
*Attorney, Agent, or Firm*—Keil & Weinkauf

[57] ABSTRACT

Magnetic recording media consisting of a non-magnetic base and, applied thereto, one or more firmly adhering magnetizable layers based on magnetic material finely dispersed in a polymeric binder, at least one lubricant and other conventional additives, wherein the lubricant used is a mixture of zinc stearate which has been rendered hydrophilic and stearylamide.

3 Claims, No Drawings

MAGNETIC RECORDING MEDIA

The present invention relates to magnetic recording media which consist of a non-magnetic base and, applied thereto, one or more firmly adhering magnetic layers based on magnetic material finely dispersed in a polymeric binder, at least one lubricant and further conventional additives.

Magnetic recording media intended for use in audio and, in particular, video recorders have to meet high standards in a large number of respects. In addition to the high demands made on their electroacoustic properties, which vary according to the type of tape, i.e. audio, video or computer tape, the magnetic layers are required to exhibit outstanding mechanical properties; there is a continual demand by tape transport manufacturers for an improvement of these properties to suit new equipment. The magnetic layers must be very flexible and possess high elasticity and great tensile strength. Moreover, in order to avoid drops in output level, it is becoming increasingly necessary to reduce the coefficient of friction, increase the resistance to abrasion and wear and improve the stability in tropical climates. Since, furthermore, improvement of the electroacoustic properties necessitates increasingly smoother magnetic coatings, it is possible in the case of soft thermoplastic magnetic layers, for the additives to exude from the magnetic layer, this taking place at temperatures as low as 20°-30° C., but particularly at elevated temperatures and high atmospheric humidity. Moreover, when solid lubricants are used, a visible coating forms on the magnetic layer. Particularly critical in this respect is the calendering step in the course of the production of the magnetic tapes, since compression of the magnetic layer is carried out at elevated temperatures and under high pressure. As a result of this treatment, the tapes form smeary deposits on recording and playback heads or the tapes block at high atmospheric humidity, particularly at elevated temperatures.

In order to avoid these drawbacks, it is necessary, in addition to using a particularly suitable magnetic material, such as chromium dioxide, cobalt-doped iron oxide and ferromagnetic metal particles, to match all the materials present in the magnetic layer so that the latter, in adition to exhibiting particularly high residual induction in the recording direction and having the required smooth surface, possesses the necessary mechanical properties. Such magnetic layers must contain a large amount of magnetizable material, and these magnetizable acicular particles must be capable of being oriented in the magnetic layer, so that they lie to a very substantial extent parallel to the intended recording direction. For a given magnetic material, it is precisely the improvement of the said properties, such as the surface smoothness, remanence and orientation ratio, coupled with the achievement of excellent mechanical properties that depends to a great extent on the binders and additives used for the production of the magnetic layer. Of the additives, lubricants, water repellants and dispersants are the ones which chiefly affect the electroacoustic, magnetic and mechanical properties of the tapes.

Reduction of the surface roughness of the magnetic layer is particularly important in the case of high-quality magnetic recording media, since particularly close tape/head contact is required for the resolution of very short wavelengths. The tapes must therefore be highly resistant to wear, since damage to the layer immediately results in drops in output level.

It has been attempted to solve these problems by adding water repellants, subsequently applying lubricants, increasing the surface hardness by crosslinking, and using a binder composition consisting of from 2 to 4 components which, if necessary, can also be crosslinked. The large number of measures proposed to date have drawbacks in respect of process technology. The running characteristics of magnetic recording media under various climatic conditions, in particular at high atmospheric humidity and high temperatures, now also serve as a feature for assessing quality.

To improve the mechanical properties, the surface smoothness and the running characteristics, small amounts of lubricants and fillers are employed in a conventional manner, these being added during the dispersing of the magnetic material in the binder, or to the finished coating mix before it is applied to the base material. Examples of such additives are fatty acids or isomerized fatty acids, such as stearic acid or its salts with metals of main groups one to four of the periodic table of elements, amphoteric electrolytes, such as lecithin, fatty acid esters, fatty acid amides, waxes, silicone oils, carbon black, etc. Particularly when they are combined with one another, these products result in very good running characteristics under normal climatic conditions. However, tapes produced therewith have only limited suitability under extreme climatic conditions, even when special binder systems as are used, for example, for audio or video tapes having a high maximum output level are employed.

For example, the combination of zinc fatty acid salts with fatty acid amides results in very low friction, but very good mechanical and electroacoustic properties at high temperatures and high atmospheric humidity can only be simultaneously achieved when zinc fatty acid salts are combined with stearylamide. Under these extreme climatic conditions, but also when the tapes are calendered at elevated temperatures and under high pressure, a white coating is formed which consists predominantly of stearylamide and partly of the zinc salt. The resulting magnetic recording media are therefore useless for practical applications.

It is an object of the present invention to provide magnetic recording media in which, as a result of the use of a special additive which is not exuded, the resistance to wear and the stability in tropical climates are improved and at the same time friction is reduced without the magnetic and electroacoustic properties being adversely affected. As a result of these improvements, drops in output level are avoided and blocking of the tapes under extreme conditions is prevented.

We have found that this object is achieved, and that magnetic recording media which consist of a non-magnetic base and, applied thereto, at least one firmly adhering magnetic layer based on magnetic material finely dispersed in a polymeric binder, at least one lubricant and conventional additives have the desired properties if the magnetic layer contains, as lubricant, a mixture of zinc stearate which has been rendered hydrophilic and stearylamide.

It is particularly advantageous if the ratio of zinc stearate which has been rendered hydrophilic to stearylamide in the lubricant mixture is higher than 1:1, particularly from 1.8:1 to 10:1, preferably from 2.5:1 to 6:1. The total amount of lubricant mixture is advantageously less than 7, preferably less than 4, % by weight, based on the magnetic material.

When the magnetic recording media are employed for special applications, it has proven advantageous to combine the lubricant mixture consisting of zinc stearate which has been rendered hydrophilic and stearylamide with other lubricants and optional flow improves.

The said zinc stearate of the lubricant mixture, which is present in the magnetic coating of the novel magnetic recording media, contains from 5 to 40, preferably from 10 to 30, % by weight of a hydrophilic component. The agent which imparts hydrophilicity consists of an alkyl chain and a hydrophilic group. Substances which are suitable for this purpose are alkyl benzenesulfonates where alkyl is of 10 to 22, preferably 16 to 20, carbon atoms. Stearyl benzenesulfonate is particularly suitable, but it is also advantageous to use hydrophilic polyethers which are esterified with fatty alcohols of 12 to 25 carbon atoms, or alkylbetains where alkyl is of 14 to 20 carbon atoms, or mono-, di- or triesters of phosphoric acid and monoalcohols of 12 to 25 carbon atoms. Preferred products are those which contain an alkyl radical of 18 carbon atoms. In the present invention, it has proven advantageous for the zinc stearate which has been rendered hydrophilic to contain not more than 10% by weight of an electrolyte, eg. $Na_2SO_4$ or NaCl.

The novel magnetic recording media are produced in a conventional manner. The binders used for dispersing the magnetic material are the conventional organic polymers usually employed for this purpose. They are described in, inter alia, German Published Application DAS No. 2,175,685 and German Pat. Nos. 2,442,762 and 2,753,694. Electron beam-curable polyurethane binders can also be employed. Low molecular weight polyurethane binders which achieve their final properties only as a result of a crosslinking reaction are preferably used (German Laid-Open Applications DOS No. 3,227,161, DOS No. 3,227,163 and DOS No. 3,227,164). Such binders are easy to disperse, can be readily calendered after the coating operation, and give magnetic layers which possess good mechanical, electroacoustic and magnetic properties. However, when they are not used in conjunction with the lubricant mixture according to the invention, they tend to cause blocking of the recording media.

Preferably used solvents are cyclic ethers, such as tetrahydrofuran and dioxane, and cyclic ketones, such as cyclohexanone. Depending on the field of use, the polyurethanes can of course also be dissolved in other highly polar solvents, such as dimethylformamide, N-methylpyrrolidone, dimethyl sulfoxide or ethylglycol acetate. It is also possible to mix the said solvents with aromatics, such as toluene or xylene, and esters, such as ethyl acetate or butyl acetate.

The magnetic materials used are finely divided acicular gamma-iron(III) oxide having a mean particle size of from 0.1 to 2 $\mu$m, in particular from 0.1 to 0.9 $\mu$m, and, preferably, acicular chromium dioxide having the same particle size as the iron oxide. Other suitable materials are gamma-iron(III) oxide doped with heavy metals, in particular with cobalt, and finely divided metal alloys of iron, cobalt and/or nickel. For the purposes of the present invention, it has proven advantageous for the magnetic material to contain from 0.3 to 2% by weight of water.

In order to improve the magnetic layer, further additives can be added to the dispersions. Examples of such additives are fatty acids, polycarboxylic acids, mono-, di- or polysulfonic acids and phosphoric acids, mixtures of these, esters, waxes, lecithins, silicone oils and fluorocarbons, as well as fillers, such as carbon black, graphite, powdered quartz and/or non-magnetizable powder based on silicates. In general, the total amount of such additives is less than 5% by weight, based on the magnetic layer.

Any crosslinking of the magnetic recording media which, depending on the binder system and spectrum of tape properties, may be required is achieved by reacting the polyurethanes or polyurethane binder mixtures with polyisocyanates. To effect crosslinking, a large number of organic di-, tri- or polyisocyanates or isocyanate prepolymers having a molecular weight of up to 10,000, preferably from 500 to 3,000, can be used. Polyisocyanates which have more than 2 NCO groups per molecule are preferred, polyisocyanates which are based on toluylene diisocyanate, hexamethylene diisocyanate or isophorone diisocyanate and are formed by polyaddition with di- and triols or by biuret and isocyanurate formation having proven particularly useful. An adduct of toluylene diisocyanate with trimethylolpropane and diethylene glycol is particularly advantageous. The amount of polyisocyanate can vary very greatly, depending on the binder system.

The novel magnetic recording media are produced in a conventional manner. For this purpose, the magnetic material together with the binder used, the lubricant mixture of the present invention, further additives, and sufficient solvent are dispersed in a dispersing apparatus, for example a tubular ball mill or a stirred ball mill. It is, however, also possible to subsequently add the novel lubricant mixture to the finished coating mix before it is applied to the base material. The desired binder/pigment ratio can be obtained by adding the binder to the mixture either in the solid state or in the form of 10 to 60% strength solutions. It has proven advantageous to continue the dispersing procedure until the magnetic material has been extremely finely dispersed, which can take from 1 to 7 days. Subsequent repeated filtration gives a completely homogeneous magnetic dispersion. Any crosslinking agents required are added to the dispersion before the coating operation.

The magnetic dispersion is then applied to the non-magnetizable base by means of a conventional coating apparatus, for example a knife coater. Suitable non-magnetic and non-magnetizable bases are the conventional ones, in particular films of linear polyesters, such as polyethylene terephthalate, which are in general from 4 to 200, in particular from 6 to 36, $\mu$m thick. Before the still fluid coating mixture is dried on the base, an operation which is advantageously carried out at from 50° to 90° C., the anisotropic magnetic particles are oriented in the intended recording direction, if necessary under the action of a magnetic field. The magnetic layers can then be calendered on a conventional apparatus by passing the coated base between polished rollers optionally heated to from 40° to 100° C., preferably from 60° to 80° C. The magnetic layer is in general from 2 to 20, preferably from 3 to 15, $\mu$m thick.

Compared with prior art magnetic recording media, the novel magnetic recording media are more hardwearing and exhibit improved stability in tropical climates, and neither stearylamide nor zinc stearate is exuded. Friction is reduced, drops in output level are avoided and blocking of the tapes is prevented.

The Examples which follow illustrate the invention, and the advantages over the prior art are demonstrated (comparative experiments). In the Examples, parts and percentages are by weight, unless stated otherwise.

The resulting magnetic recording media were subjected to the following tests:

TEST 1

Deposits 4 cassettes loaded with the magnetic tape were played back on a recorder for 20 hours at 30° C. and 93% relative humidity. The deposits on the erasing head, on the recording/playback head and on the capstan were then assessed visually. The thickness of the deposits was assessed according to a rating system of 1 to 6 (1 denoting no deposits, and 6 very thick deposits), and the average was taken.

TEST 2

Deposits under tropical climatic conditions 10 cassettes loaded with the magnetic tape were stored for 4 weeks at 40° C. and 93% relative humidity and then played back at 30° C. and 93% relative humidity. Assessment of the deposits was carried out as in Test 1.

TEST 3

Suitability for duplication

Groups of 10 cassettes were stored under the same temperature and humidity conditions as in Test 7. Each cassette was then subjected to one pass at 8 times the normal speed (38 cm/sec). The percentage of the cassettes which exhibited disturbances in the running of the tape and blocking is given.

TEST 4

Drop in output level

The number of runs until a drop in the output level of more than 2 db occurred was determined.

TEST 5

Exudation

Cassettes loaded with the magnetic tape were stored for 10 days at 50° C. in a cabinet dryer. The surface of the magnetic layer was then examined to see if any exudation had taken place; following subsequent operation on a commercial cassette recorder, the recording/reproducing head was examined to see if smeary deposits had formed thereon.

EXAMPLE 1

102 parts of tetrahydrofuran, 31 parts of a 50% strength solution of the polyurethaneureas described in Example D of German Laid-Open Application DOS No. 3,227,164, 100 parts of ferromagnetic chromium dioxide having a mean needle length of 0.5 μm, 2.0 parts of zinc stearate which had been rendered hydrophilic (zinc stearate with 6% of stearyl benzenesulfonate and 4% of sodium sulfate), 0.15 part of a commercial silicone oil and 0.5 part of stearylamide were introduced into a steel ball mill having a capacity of 600 parts by volume and containing 600 parts of steel balls having a diameter of from 4 to 6 mm, and the mixture was dispersed for 36 hours. The dispersion was then filtered under pressure, the stirred dispersion then had added to it 0.028 part, per part of dispersion, of a 75% strength solution of a triisocyanate obtained from 3 moles of toluylene diisocyanate and 1 mole of trimethylolpropane, and immediately thereafter the dispersion was applied to a 15 μm polyethylene terephthalate film. The coated film was passed through a magnetic field to orient the magnetic particles, dried at from 50° to 80° C., calendered by passing it between heated rollers (60° C., nip pressure 200 kg/cm) and slit into 3.81 mm wide tapes.

The magnetic properties were measured in a magnetic field of 160 kA/m. The residual induction was 178 mT and the orientation ratio of the magnetic particles, ie. the ratio of the residual induction in the recording direction to that at right angles to this direction, was 3.0. The results obtained in the tests are given in the Table.

EXAMPLE 2

The procedure described in Example 1 was followed, except that the lubricant mixture consisted of 1.5 parts of zinc stearate which had been rendered hydrophilic and 0.5 part of stearylamide. The test results are shown in the Table.

EXAMPLE 3

The procedure described in Example 1 was followed, except that, instead of the polymer described in Example D of German Laid-Open Application DOS No. 3,227,164, that described in Example A was employed. The test results are shown in the Table.

COMPARATIVE EXPERIMENT 1

The procedure described in Example 1 was followed, except that, instead of the zinc stearate which had been rendered hydrophilic, 1 part of pure zinc stearate and 1 part of stearylamide were employed. The test results are shown in the Table.

COMPARATIVE EXPERIMENT 2

The procedure described in Example 1 was followed, except that zinc oleate was employed instead of the zinc stearate which had been rendered hydrophilic. The test results are shown in the Table.

COMPARATIVE EXPERIMENT 3

The procedure described in Example 1 was followed, except that oleic acid amide was employed instead of the stearylamide. The test results are shown in the Table.

TABLE 1

| | Test 1 | Test 2 | Test 3 | Test 4 | Test 5 |
|---|---|---|---|---|---|
| Example 1 | 1.4 | 1.9 | 0 | >100 | none |
| Example 2 | 1.6 | 1.8 | 0 | >100 | none |
| Example 3 | 1.5 | 2.0 | 0 | >100 | none |
| Comparative Experiment 1 | 2.9 | 2.0 tapes | 0 | 80 | smeary deposits |
| Comparative Experiment 2 | 3.0 | block 7 out of | 100 | 40 | smeary deposits |
| Comparative Experiment 3 | 2.0 | 10 tapes block | 80 | >100 | smeary deposits |

We claim:

1. In a magnetic recording medium in which at least one firmly adhering magnetizable layer based on magnetic material finely dispersed in a polymeric binder, at least one lubricant and conventional additives, is applied to a non-magnetic base, the improvement which comprises using as the lubricant a mixture of (a) zinc stearate, which is rendered hydrophilic by means of a precoating treatment with an agent which consists of an alkyl chain and a hydrophilic group selected from the group consisting of alkyl benzenesulfonates where alkyl is of 10 to 22 carbon atoms, polyethers which are esterfied with fatty alcohols of 12 to 15 carbon atoms, alkylbetains where alkyl is of 14 to 20 carbon atoms, mono-, di- or triesters of phosphoric acid, and monoalcohols of 12 to 15 carbon atoms, which agent is present in an amount of from 5 to 40% by weight, (b) an electrolyte in an amount of not more than 10% by weight based on the hydrophilic zinc stearate and (c) stearylamide.

2. A magnetic recording medium as defined in claim 1, wherein the zinc stearate is rendered hydrophilic by treatment with stearylbenzenesulfonate.

3. A magnetic recording medium as defined in claim 1, wherein the lubricant mixture used consists of stearylamide and zinc stearate which has been rendered hydrophilic and contains not more than 10% by weight of an electrolyte.

* * * * *